(12) United States Patent
Georgis

(10) Patent No.: US 8,060,893 B2
(45) Date of Patent: Nov. 15, 2011

(54) DATA STORAGE CARTRIDGE WITH OPTICAL WAVEGUIDE

(75) Inventor: Steven P. Georgis, Boulder, CO (US)

(73) Assignee: Tandberg Data Holdings S.A.R.L., Grand Duchy of Luxembourg (LU)

( * ) Notice: Subject to any disclaimer, the term of this patent is extended or adjusted under 35 U.S.C. 154(b) by 779 days.

(21) Appl. No.: 12/117,507

(22) Filed: May 8, 2008

(65) Prior Publication Data

US 2009/0310253 A1 Dec. 17, 2009

Related U.S. Application Data

(62) Division of application No. 11/149,623, filed on Jun. 10, 2005, now abandoned.

(60) Provisional application No. 60/586,087, filed on Jul. 6, 2004.

(51) Int. Cl.
*G11B 17/04* (2006.01)
(52) U.S. Cl. ....................................................... 720/600
(58) Field of Classification Search .................... 720/600
See application file for complete search history.

(56) References Cited

U.S. PATENT DOCUMENTS

| | | |
|---|---|---|
| D260,881 S | 9/1981 | McKinsey et al. |
| D311,737 S | 10/1990 | Westwood et al. |
| 5,075,805 A | 12/1991 | Peddle et al. |
| 5,216,582 A | 6/1993 | Russell et al. |
| 5,694,278 A | 12/1997 | Summer |
| 5,721,655 A | 2/1998 | Thweatt |
| 5,790,374 A | 8/1998 | Wong |
| D413,592 S | 9/1999 | Saiba et al. |
| 5,986,992 A | 11/1999 | Bardmesser |
| 6,064,569 A | 5/2000 | Sands et al. |
| 6,231,224 B1 | 5/2001 | Gamble et al. |
| 6,272,010 B1 | 8/2001 | Schmitt |
| 6,381,662 B1 | 4/2002 | Harari et al. |
| 6,419,403 B1 | 7/2002 | Buller et al. |
| D462,093 S | 8/2002 | Ashida |
| 6,431,718 B1 | 8/2002 | Gamble et al. |
| 6,457,992 B2 | 10/2002 | Posey et al. |
| 6,473,300 B1 | 10/2002 | Youngquist et al. |

(Continued)

FOREIGN PATENT DOCUMENTS

JP 06-337819 12/1994

(Continued)

OTHER PUBLICATIONS

EP Supplementary Search Report mailed Nov. 11, 2010; Application No. 05758581.2; 3 pages.

(Continued)

*Primary Examiner* — Angel A. Castro
(74) *Attorney, Agent, or Firm* — Kilpatrick Townsend & Stockton, LLP

(57) ABSTRACT

According to the invention, an electronic data storage cartridge for removable coupling to a computing system is disclosed. The electronic data storage cartridge includes a cartridge body, a connector, an optical waveguide, a hard disk drive, and a mechanical write-protect switch that prevents modification of information on the hard disk drive when active. The cartridge body includes at least two outer surfaces. The connector can be used for removable coupling to the computing system, where the connector couples information outside the cartridge body. The optical waveguide is configured to couple light between the two outer surfaces. The hard drive is coupled to the connector.

26 Claims, 7 Drawing Sheets

U.S. PATENT DOCUMENTS

| | | |
|---|---|---|
| 6,487,049 B1 | 11/2002 | Hall |
| D470,851 S | 2/2003 | Nishio et al. |
| D474,193 S | 5/2003 | Nakayama |
| D478,358 S | 8/2003 | Ashida |
| 6,611,394 B1 | 8/2003 | Kato et al. |
| 6,614,751 B1 | 9/2003 | Katao |
| 6,618,795 B2 | 9/2003 | Chan et al. |
| 6,674,596 B1 | 1/2004 | Takayama |
| 6,717,762 B1 | 4/2004 | Bauck et al. |
| 6,717,769 B2 | 4/2004 | Staley et al. |
| 6,728,187 B2 | 4/2004 | Diaz et al. |
| 6,762,930 B2 | 7/2004 | Minne' |
| 6,785,896 B2 | 8/2004 | Huang |
| 6,831,831 B2 | 12/2004 | Bicknell et al. |
| 6,865,640 B2 | 3/2005 | Dimitri et al. |
| 6,892,275 B2 | 5/2005 | Bolt et al. |
| 6,957,291 B2 | 10/2005 | Moon et al. |
| 6,968,561 B2 | 11/2005 | Katao |
| 7,008,240 B1 * | 3/2006 | Wang et al. .................. 439/76.1 |
| D523,859 S | 6/2006 | Deckers |
| 7,307,836 B2 | 12/2007 | Scicluna et al. |
| 7,321,489 B2 | 1/2008 | McAlister |
| 7,476,105 B2 * | 1/2009 | Ni et al. ......................... 439/66 |
| 7,507,119 B2 * | 3/2009 | Ni et al. ................... 439/607.31 |
| 7,535,088 B2 * | 5/2009 | Ni et al. ........................ 257/679 |
| 2002/0135938 A1 | 9/2002 | Hiraguchi et al. |
| 2002/0196577 A1 | 12/2002 | Harmer |
| 2003/0149700 A1 | 8/2003 | Bolt |
| 2003/0218957 A1 | 11/2003 | Tanishima |
| 2004/0032711 A1 | 2/2004 | Kaczeus et al. |
| 2004/0081054 A1 | 4/2004 | Nguyen |
| 2004/0181388 A1 | 9/2004 | Yip et al. |
| 2005/0033911 A1 | 2/2005 | Kitamura et al. |
| 2005/0099969 A1 | 5/2005 | Roberts et al. |
| 2005/0193235 A1 | 9/2005 | Sandorfi et al. |
| 2006/0010458 A1 | 1/2006 | Georgis |
| 2006/0129373 A1 | 6/2006 | Georgis |
| 2006/0129711 A1 | 6/2006 | Matsushige |

FOREIGN PATENT DOCUMENTS

JP 2004-145866 5/2004

OTHER PUBLICATIONS

"What is iVDR?," printout from website http://www.ivdr.org/iVDR/ivdr_e.html, 2 pages, printout date: May 27, 2004.

* cited by examiner

Fig. 8A
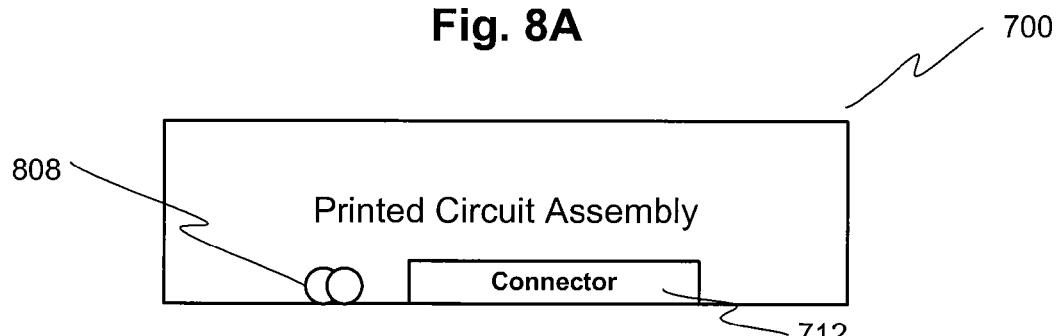
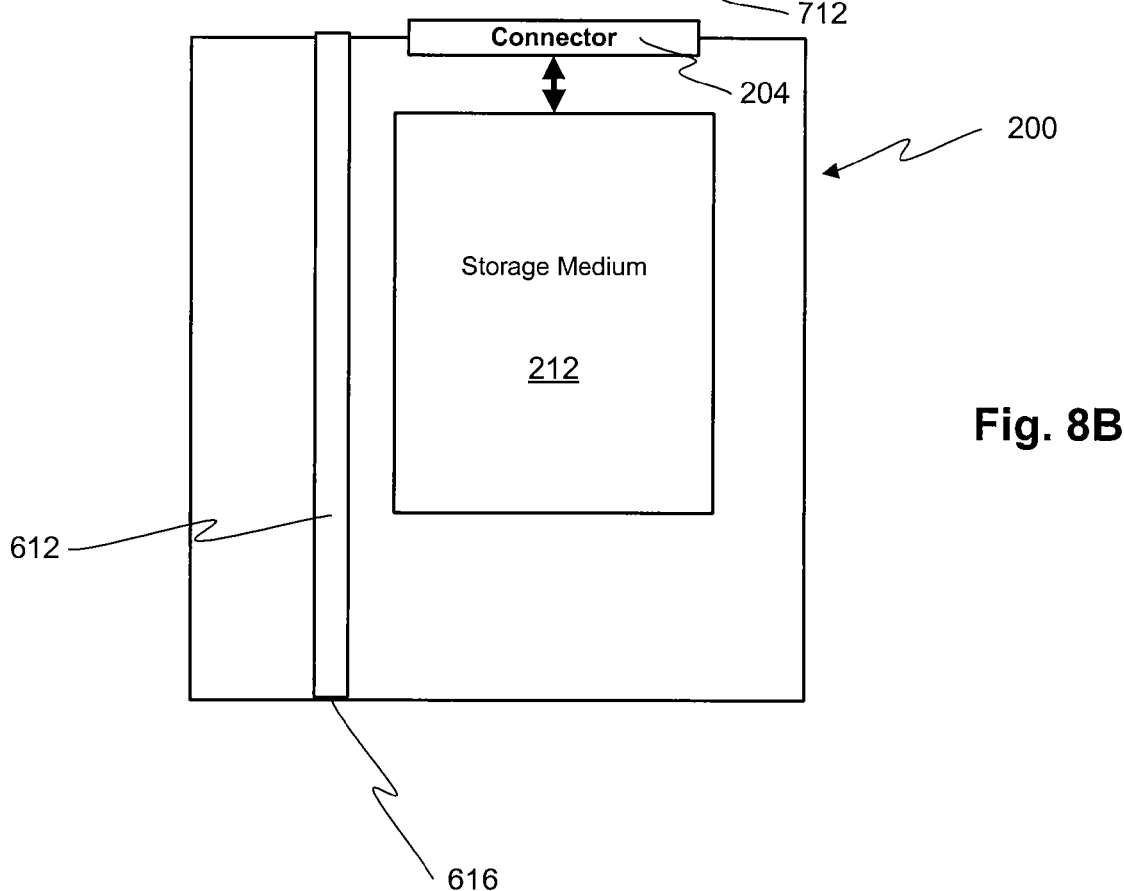
Fig. 8B

DATA STORAGE CARTRIDGE WITH OPTICAL WAVEGUIDE

This application is a divisional of U.S. patent application Ser. No. 11/149,623, filed Jun. 10, 2005, entitled ELECTRONIC STORAGE CARTRIDGE, which claims the benefit of and is a non-provisional of U.S. Provisional Application Ser. No. 60/586,087 filed on Jul. 6, 2004, and both of those applications are hereby incorporated herein by reference in their entirety for all purposes.

BACKGROUND OF THE DISCLOSURE

This disclosure relates in general to storage systems and, more specifically, but not by way of limitation, to storage cartridges.

Removable cartridges for data storage applications come in two basic types: those containing storage media such as magnetic tape or magnetic disk, and those containing electronic storage elements such as flash memory chips (e.g., Compact Flash cards). The first type of cartridge is normally a passive mechanical device where the media (e.g., tape) is pulled out of the cartridge to contact the recording heads or where the heads are inserted into the cartridge to contact the fixed media (e.g., a disk cartridge). The first type normally has no electrical signals passed to the cartridge at all. In the second type, the connection with the cartridge is made by an electrical connector and information is passed electronically via the connector.

There are external enclosures that hold a hard drive. These enclosures are coupled to a computer with a universal serial bus (USB) or Fire Wire. The computer can mount these drives into the operating system environment to allow reading and writing to the hard drive. In some cases, the external enclosure has a separate power supply, while in others, the interface cable to the computer provides the power. Often, these enclosures have embedded LEDs to show power and access to the hard drive.

There are hard drives that can be plugged-into standard computer ports. The Compact Flash form factor has compliant cards that include a small hard drive. The PC Card or PCMCIA card format also has compliant cards with hard drives. Both the Compact Flash and PC Card formats support flash-based memory to allow mass storage.

BRIEF DESCRIPTION OF THE DRAWINGS

The present disclosure is described in conjunction with the appended figures:

FIG. 8A is a block diagram of an embodiment of a drive bay circuit card;

FIG. 8B is a top-sectional view of still another embodiment of the electronic data storage cartridge.

Figure 1:
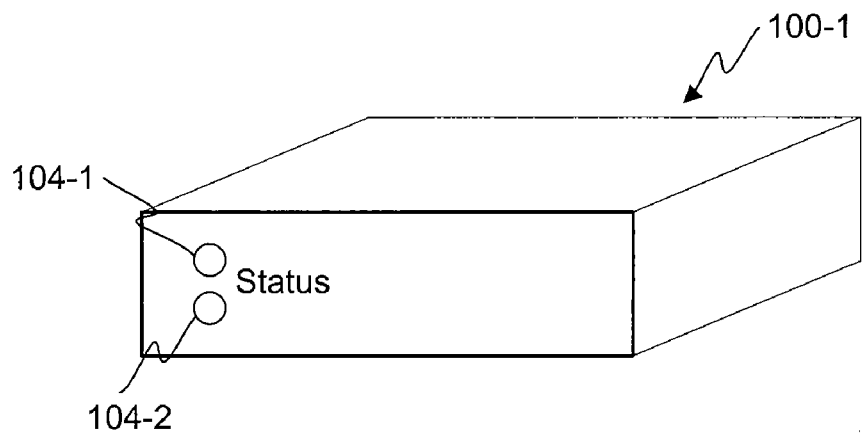
FIG. 1 is a perspective view of an embodiment of an electronic data storage cartridge.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE PREFERRED EMBODIMENT

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the spirit and scope of the invention as set forth in the appended claims.

An embodiment of an electronic data storage cartridge discloses an invention where electronic emitters or indicators (e.g. LEDs) are contained in the cartridge to provide the user with cartridge status and activity. These indicators may be controlled by external electronics via dedicated connections to the cartridge or by electronics contained inside the electronic data storage cartridge.

In one embodiment, the electronic data storage cartridge uses an electrical connector to interface to the contained storage medium which may be electronic memory (e.g. flash), a HDD or other type of medium. The electronic data storage cartridge can include an optical waveguide that allows light to pass through the electronic data storage cartridge. The optical waveguide can pass light generated by the docking bay or socket and passed through the electronic data storage cartridge such that the light is visible when the electronic data storage cartridge is inserted in the socket.

In another embodiment, there is no LED within the electronic data cartridge. A passive design is used to indicate status and activity. Embedded in the electronic data storage cartridge are one or more passive optical waveguides. The waveguides are fabricated from plastics (i.e., optical-grade clear acrylic or Lexan polycarbonate plastics) or any other translucent material. The difference between the indices of refraction between the waveguide material and the surrounding air or cartridge shell causes any visible light that is coupled into one the end of the waveguide to be contained inside the waveguide by the principal of total internal reflection. The light therefore propagates to the other end(s) of the waveguide where it is emitted.

Other embodiments could use both internal and external emitters for status. A mixture of emitters powered from within the cartridge and one or more optical waveguides passively conveying light could be used. In one of these embodiments, an optical waveguide is coupled to an emitter within the cartridge body and coupled to an emitter in the drive bay to alternatively pass light. The light from the various sources could be of different colors that can be mixed in the optical waveguide.

In another embodiment, the present invention provides intelligent operation and status reporting in electronic data storage cartridges containing an electronically-based storage medium such as a hard disk drive, flash memory, etc. Electronic data storage cartridges are subject to operational and failure conditions that are not normally present in passive type of data cartridges such as tape or optical disks. There is electrical power applied to these electronic data storage cartridges while they are in operation (e.g., plugged into their docking bay, drive bay or socket). This embodiment provides for internal electronics which provide intelligent features that include: optical waveguide(s) and/or internal emitters; sensing or cartridge insertion and ejection; sensing of shock, vibration or over-voltage conditions which might damage the storage device; status indication of cartridge status (e.g., ready, power on, transferring data, error condition, etc.); sensing of write-protect switch state; and/or cartridge identification (e.g., serial number, bar code data, IP address, RFID, etc.).

An electronic data storage cartridge containing a storage medium such as a hard disk drive (HDD), flash memory or other solid-state memory, which also includes a set of embedded electronics for the purpose of providing intelligence and additional features to the electronic data storage cartridge that are removable from the host system. Besides housing storage media that normally have power provided, the electronic data storage cartridge could include a magnetic disk(s) or tape media instead. During use, the electronic data storage cartridge is inserted into a bay or drive. This insertion is similar in manner to those of tape drives such that 10%, 20%, 30% . . . 100% (or any amount of insertion in the range of 10-100%) of the width or length is inserted into the bay when operating.

In one embodiment, the storage medium is a hard disk. For example, a 1", 1.8", 2.5" or 3.5" hard drive could be used. The hard drive could be self-contained in that it could operate outside of the cartridge as it is largely a standard hard drive. The hard drive would have its own enclosure within the cartridge. The firmware may be slightly modified to support other functions of the electronic data storage cartridge.

Some embodiments could have a battery or capacitor for backup, an electronic display and/or power while shutting down. The persistent or transient power could be used to orderly shutdown the electronics when an unexpected removal of the electronic data storage cartridge or power loss happens. Persistent power could keep the display and status indicators active. Some portion of the electronic data storage cartridge may remain powered while the electronic data storage cartridge is out of the drive, while other circuits are put in a sleep mode.

Many different functions are possible for an electronic data storage cartridge with embedded electronics. Some of the functions that can be implemented are: internal diagnostics of the storage device and cartridge; sensing of excessive shock, vibration and other environmental conditions; sensing of excessive voltage or static electricity; cartridge identifications (e.g. serial #, IP address, bar-code, RFID, etc.); sensing of cartridge insertion and ejection from its docking connector or drive bay; control of cartridge ejection or removal from its connector or drive bay; status indication (e.g. ready, power-on, error conditions, transferring data, etc.); write protect switch to prevent modifying data on the cartridge when the write protect switch is active; eject button for controlling removal of the cartridge from its connector or bay; an electronic eject latch could be integral to the electronic data storage cartridge and actuated by the electronics under the control of the host computer.

The intelligence can be implemented by way of an embedded microcontroller and associated interface electronics and sensors mounted on a printed circuit board inside the electronic data storage cartridge. The one or more PCBs also host the electronic data storage cartridge connector and memory device.

One embodiment has an eject/release button on the electronic data storage cartridge. Conventional storage drives have some separate mechanism to signal removal of the electronic data storage cartridge (e.g. an icon on the computer screen or button on the system or drive front panel). If the device is removed without first activating the system mechanism, error conditions or damage to the electronic data storage cartridge can result. By including the eject/release function in the electronic data storage cartridge itself, errors are prevented. The user would activate the button and the drive would eject the electronic data storage cartridge after proper shutdown. This eject/release could be a mechanical button, touch sensing electronic button, a soft button presented on a touch sensitive screen, etc.

Another embodiment could mechanically lock the electronic data storage cartridge into the drive bay until a proper shutdown. Activation of the eject button would cause an orderly shutdown of the electronic data storage cartridge. Once the shutdown is complete, the mechanical lock would be disengaged to allow removal of the cartridge. Other embodiments could keep the electronic data storage cartridge internal to and inaccessible in the drive bay until shutdown and eject of the electronic data storage cartridge.

Yet another embodiment could have shock sensing. In the case of a hard disk drive (HDD) as the storage medium in the electronic data storage cartridge, which is sensitive to excessive shock and vibration, an embedded shock sensor can detect an over-shock condition and provide a warning to the user and to the system. If the sensor is of a latching type, the condition can be sense even when power is removed by the microcontroller once it is next powered up. The sensor information can be used in warranty repair situations to confirm the damage isn't caused by the mistreatment of the electronic data storage cartridge. The shock sensor could automatically park the heads of the HDD before further damaging the disk.

When the electronic data storage cartridge is out of the bay, the shock sensor could be powered to wake certain functions of the electronic data storage cartridge. For example, the display could activate when movement is sensed. After a period of time, the display could automatically go into sleep mode.

One embodiment could do encryption and/or compression for the data written to the electronic data storage cartridge. These circuits could improve over time to provide better performing electronic data storage cartridges even when the storage media remains the same.

Some electronic data storage cartridges could have authorization and authentication functions. An embodiment of the electronic data storage cartridge could require authorization (e.g., a password) before allowing new data before allowing access to the storage media. Authentication could be performed by the electronic data storage cartridge to confirm the drive is allowed to access this storage media. Electronic data storage cartridges could be locked to a particular drive, a particular drive manufacture and/or a defined group of drives. Authentication prevents the electronic data storage cartridge from working in unapproved drives. One method of authentication could be to use a private/public key encryption for the data.

One embodiment includes some type of status indication. An LED or LCD-type indicator on the back of the electronic data storage cartridge can indicate the state of the electronic data storage cartridge (e.g. transferring data, idle, error conditions, power applied, etc.). The status indicator can work in conjunction with the eject/release button to inform the user when it's OK to remove the electronic data storage cartridge. The LED emitter could be within the electronic data storage cartridge and/or passed through the electronic data storage cartridge with an optical waveguide.

Some embodiments could include a display that has information about the electronic data storage cartridge. For example, a title, time of last backup, capacity used, capacity remaining, error conditions, could be written to this display. A battery back-up could keep the display active between uses. A button, such as the eject button, could be used to only activate the display a short period of time to conserve power. The software program on the host system could be used to program the information on this display.

One embodiment of the electronic data storage cartridge has self-contained eject button and status indicators. Conventional systems put these on the drive outside the bay and not the electronic data storage cartridge. By putting these on the electronic data storage cartridge, the drive faceplate can be smaller. An electronic data storage cartridge housing a HDD with embedded eject button and status indicators reduce the size of the front-panel on the mating system thereby allowing the system to fit into a smaller package such as a 3.5" computer peripheral drive bay or 2U rack mount, for example.

In an alternative embodiment of the electronic data storage cartridge, there is no separate microprocessor in the cartridge case, but could have electronic circuits such as state machines. Instead, the microprocessor embedded inside the HDD provides the intelligence and interface between the cartridge sensing/status circuits and the host system. In one embodiment, the hard disk drive (HDD) communicates with the host system via a standard parallel ATA, parallel SCSI, serial-ATA (SATA) or serial SCSI (SAS) interface (these interfaces are at least some of the signals on the cartridge connector). The internal microprocessor of the HDD interfaces via a set of I/O pins on the HDD to the various circuits external to the HDD, but within the electronic data storage cartridge. The software, which provides the intelligence related to those sensors/indicators in the electronic data storage cartridge, runs on the HDD's microprocessor.

For communication between the cartridge circuitry (i.e., outside the HDD, but within the electronic data storage cartridge) and the host system, communication protocols within the SCSI, ATA, SATA or SAS interface are used to convey signals and/or messages back and forth in one embodiment. This particular feature is used in system implementations where the only electrical interface available between the electronic data storage cartridge and the system is a standardized interface such as SATA, SAS or SCSI. These interfaces do not provide unused I/O pins for transferring other signals such as those present in the electronic data storage cartridge, so the command protocols within these standards is used. In one embodiment, the HDD or backup software includes modifications which define status and action conditions that are communicated to the host system over the standard interfaces' facilities for vendor-unique commands & status. In this new invention for a very low-cost solution, the only connection between the cartridge docking bay and the host is the HDD interface such as SATA. There is no way to interface the signals of an unload button or status indicators directly because there are no available I/O pins.

In an electronic data storage cartridge with an electrical connection, the invention has several attributes. First, it can provide for a visual indication of when an electronic data storage cartridge has been inserted and positively engaged to the mating connector. In this case, one of the indicators turns on (e.g., green). When data transfer activity is occurring, the indicator may blink. This provides the user with a visual indication that the electronic data storage cartridge should not be removed.

Many data cartridges include a write-protect feature—normally a mechanical switch which engages with the mating system. In many cases, the position of the switch is not visible once the cartridge is loaded. An optical indicator (e.g., red) can be illuminated to signal when the electronic data storage cartridge is write-protected. The indicators can alert the user of an error or fault condition in the electronic data storage cartridge (e.g., blinking alternately). Where the emitter for the indicator is within the drive bay, there is an optical interface or connector to a waveguide in the electronic data storage cartridge.

With reference to FIG. 1, a perspective view of an embodiment of an electronic data storage cartridge 100 is shown. This embodiment has two status indicators 104. The indicators 104 are on the back of the electronic data storage cartridge 100 and could each be a single color or multiple colors. Various information could be reflected by these status indicators, for example, read active, write active, write protected, error, power applied, cartridge locked into the drive bay, etc.

Figure 2:
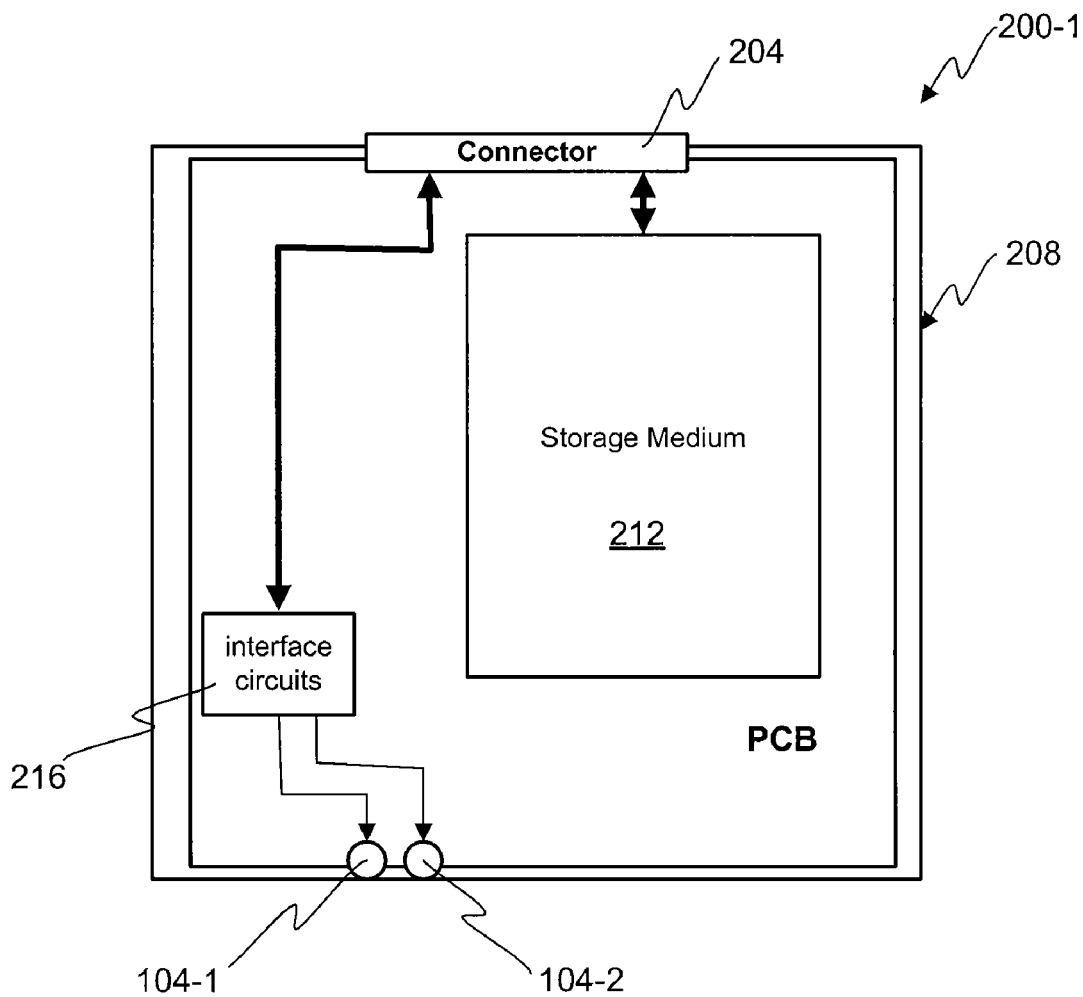
FIG. 2 is a block diagram of the embodiment of the electronic data storage cartridge shown in FIG. 1.

Referring next to FIG. 2, a block diagram of the embodiment of the electronic data storage cartridge 200-1 is shown. This block diagram corresponds to the embodiment of FIG. 1. Within the electronic data storage cartridge 100 are interface circuits 216 that are coupled to a connector 204. The interface circuits 216 drive the status indicators 104. A storage medium 212 within the storage cartridge holds the information for the electronic data storage cartridge. The storage medium 212 could be a hard drive or flash memory based. In this embodiment, the storage medium 212 is a standard off-the-shelf hard drive mounted in the cartridge 208. Shock absorbing material could be used in mounting the storage medium 212.

Figure 3:
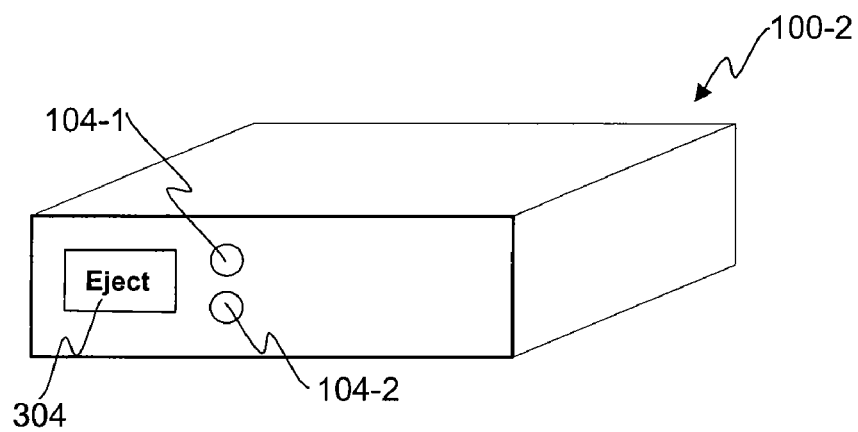
FIG. 3 is a perspective view of another embodiment of the electronic data storage cartridge.

With reference to FIG. 3, a perspective view of another embodiment of the electronic data storage cartridge 100-2 is shown. In addition to status indicators 104, this embodiment includes an eject button 304 on the back of the electronic data storage cartridge 100-2. The eject button 304 is an electronic or mechanical button that indicates to the electronic data storage cartridge 100-2 and drive bay that the user wishes to shut down the electronic data storage cartridge 100-2 and have it ejected. Activation of the eject button 304 would deactivate any mechanical lock that some embodiments include.

Figure 4:
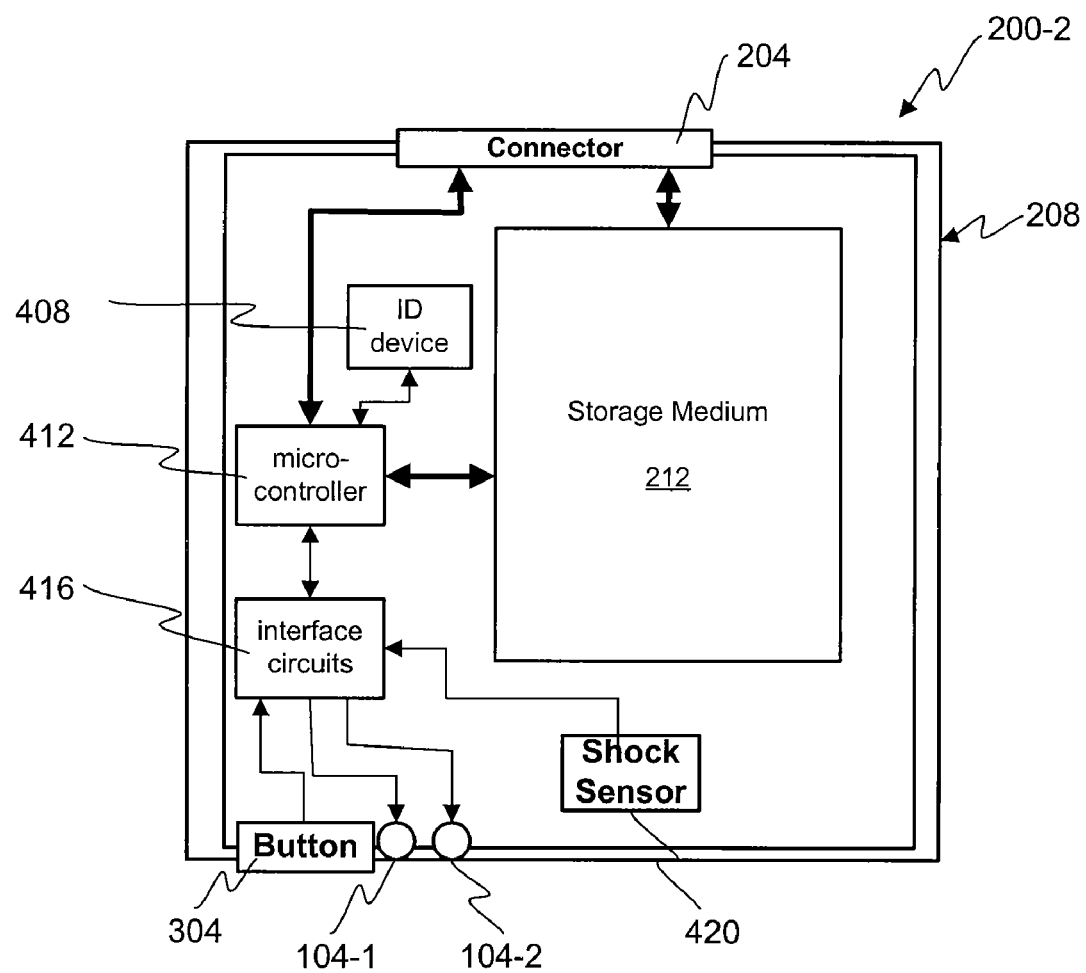
FIG. 4 is a block diagram of another embodiment of the electronic data storage cartridge shown in FIG. 3.

Referring next to FIG. 4, a block diagram of another embodiment of the electronic data storage cartridge 200-2 is shown. This block diagram corresponds to the embodiment of FIG. 3. The connector 204 is coupled to the storage medium 212 and a microcontroller or processor 412. The microcontroller 412 can interface with the storage medium, interface circuits 416 and an identification (ID) device 408. The interface circuits 416 interface with the eject button 304, the status indicators 104 and a shock sensor 420. Other embodiments could include a subset of these blocks.

The ID device 408 holds a unique serial number for the electronic data storage cartridge 200-2. Some embodiments could include a RFID tag in the ID device to allow reading of the electronic data storage cartridge 200-2 in more flexible ways. The ID device could also store other information such as status, authentication keys, authorization keys, encryption keys, hours of activity, error conditions, etc.

The shock sensor is used in this embodiment to protect the storage medium 212 if it has moving parts. For example, a hard drive can be damaged with excessive acceleration or deceleration. The shock sensor 420 could measure movement, report it to the microcontroller 412 who would cause the storage medium to park the hard drive heads.

Figure 5:
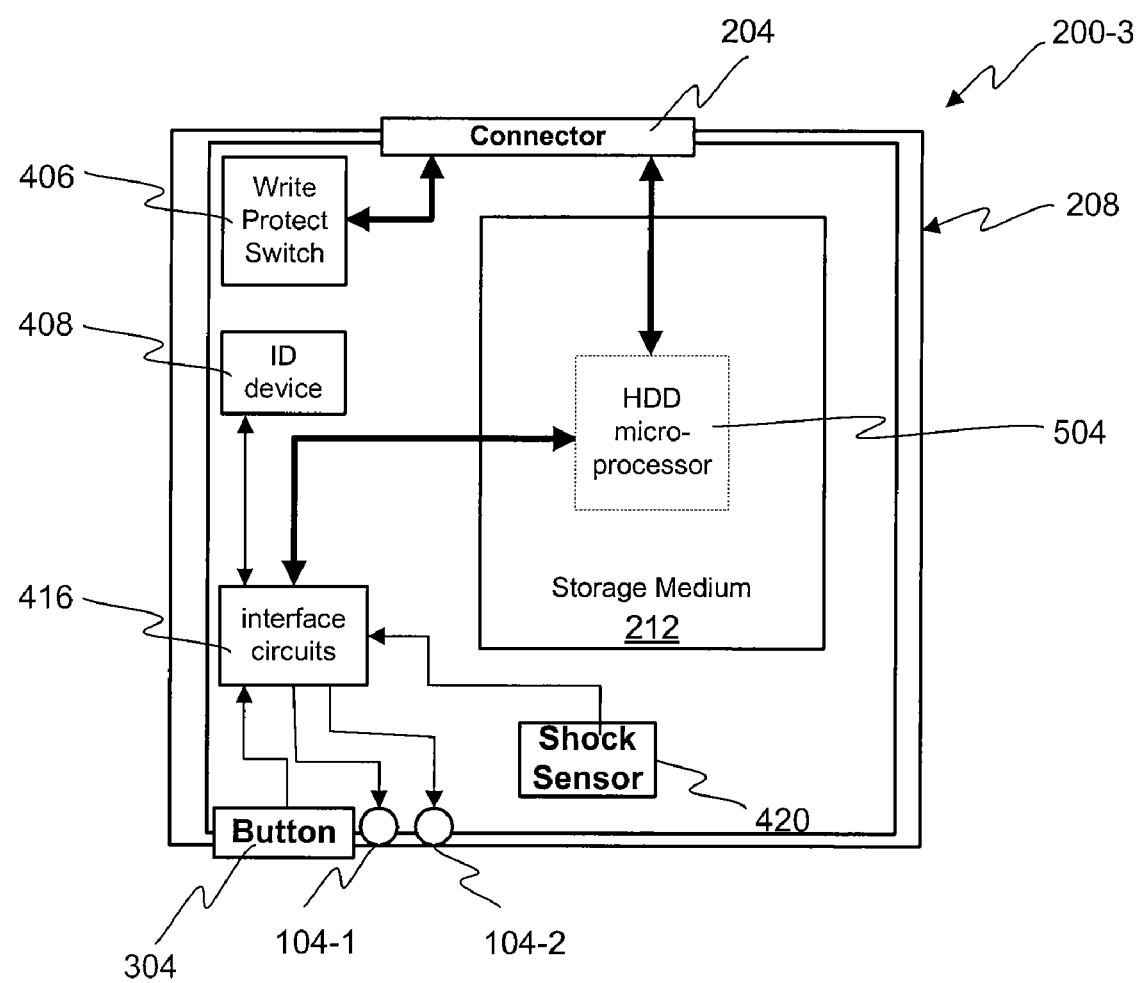
FIG. 5 is a block diagram of another embodiment of the electronic data storage cartridge.

With reference to FIG. 5, a block diagram of another embodiment of the electronic data storage cartridge 200-3 is shown. This embodiment uses the microprocessor 504 within the storage medium 212 to control circuits outside the storage medium 212. The firmware of the storage medium could be rewritten for an off-the-shelf hard drive to support these extra functions. This figure shows use of a write protect switch 406 that is mechanically actuated. When active, the electronic data storage cartridge 200-3 cannot have its stored data modified.

Figure 6A:
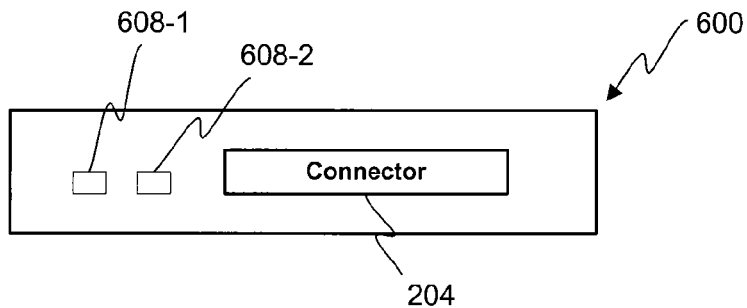
FIGS. 6A, 6B and 6C are a front, top-sectional and back views of yet another embodiment of the electronic data storage cartridge.
Figure 6B:
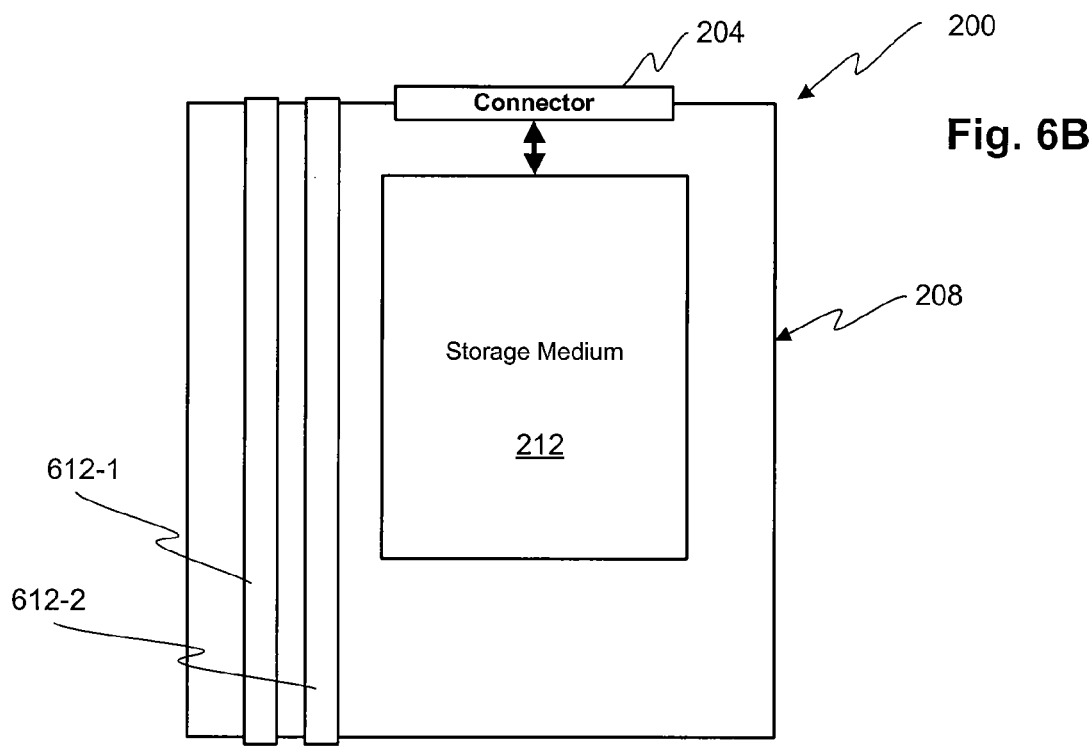
Figure 6C:
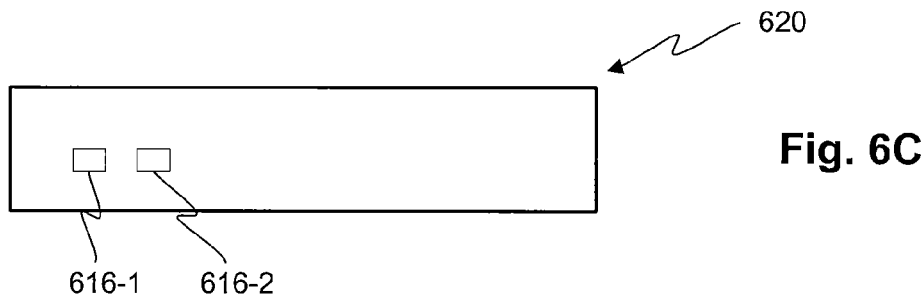

Referring next to FIGS. 6A, 6B and 6C, a back view 600, top-sectional view 610 and front view 620 of yet another embodiment of the electronic data storage cartridge 100 are shown. FIG. 6A shows the connector end of the electronic data storage cartridge 100 with the two exposed waveguide ends 608. The waveguide ends 608 can be thought of as an optical connector. FIG. 6B shows the inside of the electronic data storage cartridge containing the electronic storage medium (e.g., HDD) 212 and its dedicated connector 204 along with the waveguides 612. The waveguides couple light from an emitter of the drive bay to the back of the electronic data storage cartridge 100. FIG. 6C shows the opposite side of the electronic data storage cartridge (which faces the user when the electronic data storage cartridge 100 is inserted into its mating drive bay) and the indicator ends 616 of the waveguides 612. This embodiment has two waveguides 612 than can each couple one or multiple color light.

Figure 7A:
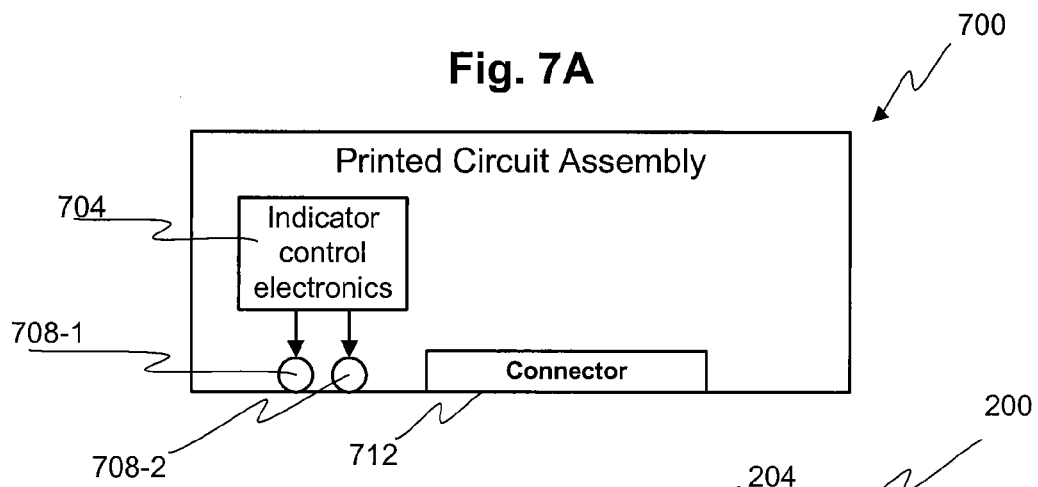
FIG. 7A is a block diagram of an embodiment of a drive bay circuit card.

With reference to FIG. 7A, a block diagram of an embodiment of a drive bay circuit card 700 is shown. The electronic data storage cartridge 100 is normally coupled to an assembly 700 containing the mating connector 712 to the storage medium. This assembly (typically a PCB) also contains one or more light sources 708 such as LEDs which are aligned to the ends of the waveguides when the electronic data storage cartridge is inserted into the mating connector. The LEDs are controlled by electronic circuits 704 contained on the PCB to indicate various status conditions. When one or more LEDs are turned on, the indicator end 616 of the waveguide 612 on the front of the electronic data storage cartridge 100 is illuminated by the light emitted from the corresponding LED.

Figure 7B:
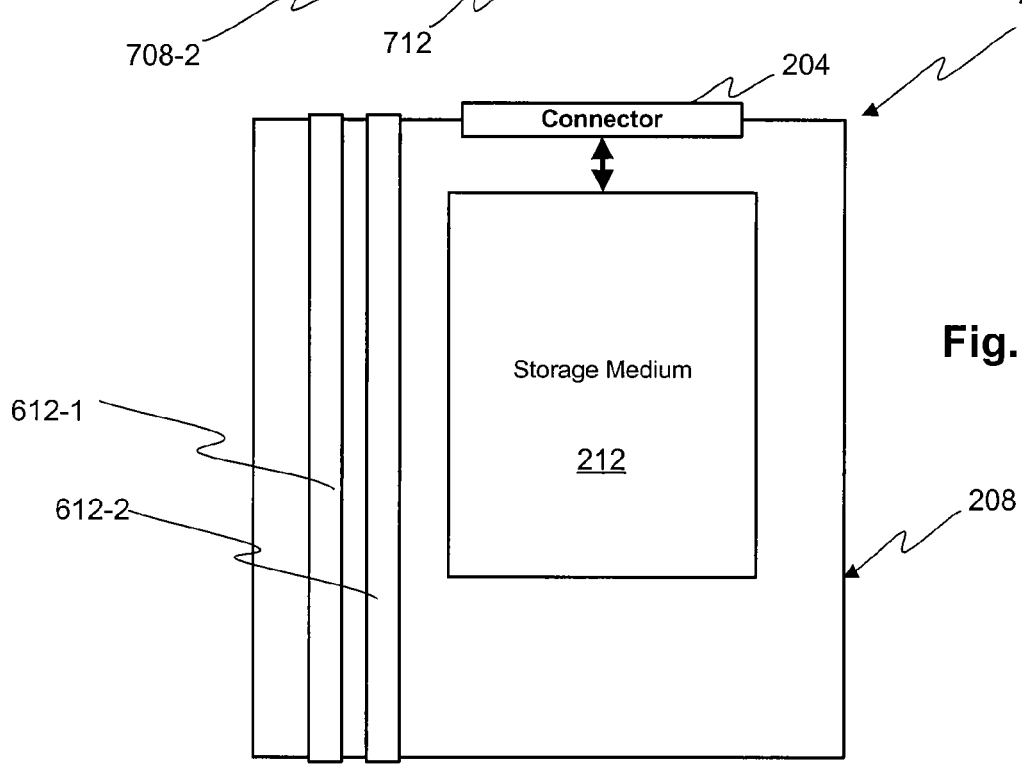
FIGS. 7B and 7C are a top-sectional and back views of yet another embodiment of the electronic data storage cartridge.
Figure 7C:
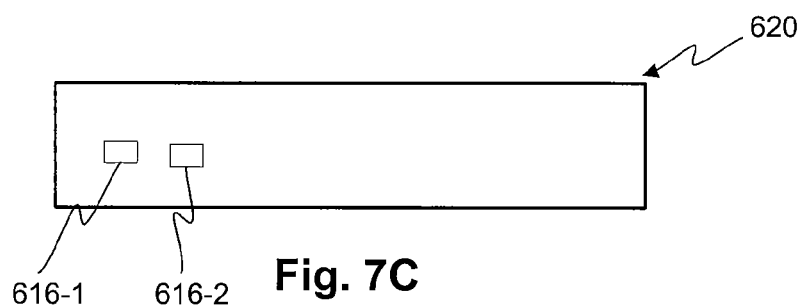

Referring next to FIGS. 7B and 7C, a top-sectional and front views of yet another embodiment of the electronic data storage cartridge are shown. These are shown aligned with the drive bay circuit card 700.

With reference to FIG. 8A, a block diagram of another embodiment of a drive bay circuit card 700 is shown. This embodiment shows a variation where a waveguide 612 can be coupled to a multi-colored LED 808 to provide multi-colored indications with a single waveguide 612. Some embodiments could have one color emitter on the drive bay circuit card 700 and another color emitter within the cartridge 208 that are both coupled to the waveguide 612.

Referring next to FIG. 8B, a top-sectional view of still another embodiment of the electronic data storage cartridge 100 is shown. This embodiment show the single waveguide 612. The connector 204 is a standard PATA or SATA interface in this embodiment. No additional electrical interface is used for the electronic data storage cartridge 100.

Figure 9:
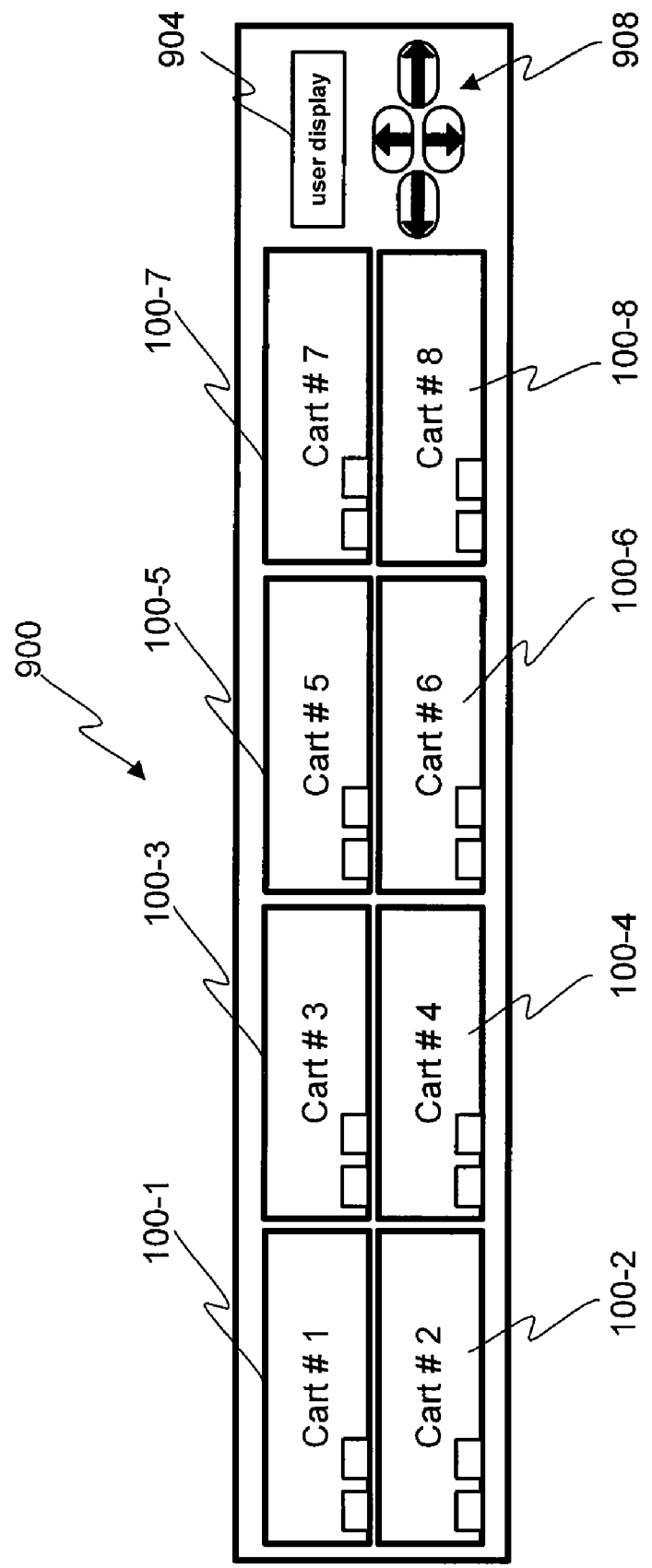
FIG. 9 is a back view of an embodiment of a multiple-drive bay cartridge system.

With reference to FIG. 9, a front view of an embodiment of a multiple drive bay cartridge system 900 is shown. In conventional systems, the functions of the status LEDs or optical waveguides are incorporated into the front panel or bezel of a system. However, as system designs get smaller in size, there may not be sufficient space on the front panel. FIG. 9 shows an example application where the use of invention is important. The cartridge system 900 in FIG. 9 is an array of removable data electronic data storage cartridges 100 packed densely into an enclosure 912. The available space may not provide adequate room for the indicators for each electronic data storage cartridge to be located on the front panel. In this application, the visual indication is obviously associated with its own electronic data storage cartridge. A common set and controls 908 and user display 904 is used to navigate and control the cartridge system 900.

While the principles of the invention have been described above in connection with specific apparatuses and methods, it is to be clearly understood that this description is made only by way of example and not as limitation on the scope of the invention.

What is claimed is:

1. An electronic data storage cartridge for removable coupling to a computing system, the storage cartridge comprising:
    a cartridge body, wherein the cartridge body includes at least two outer surfaces;
    a connector for removable coupling to the computing system, wherein the connector couples information outside the cartridge body;
    an optical waveguide configured to couple light between the two outer surfaces;
    a hard disk drive coupled to the connector; and
    a write-protect switch, which is a mechanical switch on the cartridge body that prevents modification of information on the hard disk drive when active.

2. The electronic data storage cartridge for removable coupling to the computing system as recited in claim 1, wherein:
    the cartridge body is configured for removable insertion of the cartridge body into a bay comprising a mating system; and
    the write-protect switch is configured to engage with the mating system.

3. The electronic data storage cartridge for removable coupling to the computing system as recited in claim 1, wherein:
    the cartridge body is configured for removable insertion of the cartridge body into a bay; and
    the position of the write-protect switch is not visible once the cartridge body is inserted into the bay.

4. The electronic data storage cartridge for removable coupling to the computing system as recited in claim 1, wherein:
    the cartridge body is configured for removable insertion of the cartridge body into a bay comprising an optical indicator; and
    the optical waveguide receives light at one outer surface from the optical indicator and couples it to the other outer surface to visibly signal that the electronic data storage cartridge is write-protected.

5. The electronic data storage cartridge for removable coupling to the computing system as recited in claim 1, wherein the two outer surfaces are on opposite ends of the storage cartridge.

6. The electronic data storage cartridge for removable coupling to the computing system as recited in claim 1, wherein the hard disk drive is restrained between the at least two outer surfaces.

7. The electronic data storage cartridge for removable coupling to the computing system as recited in claim 1, wherein the connector is at least one of an optical connector and an electrical connector.

8. The electronic data storage cartridge for removable coupling to the computing system as recited in claim 1, further comprising electronic circuitry within the cartridge body and coupled to the connector.

9. The electronic data storage cartridge for removable coupling to the computing system as recited in claim 1, wherein the hard disk drive comprises a serial advanced technology attachment (SATA) or parallel advanced technology attachment (PATA) interface.

10. The electronic data storage cartridge for removable coupling to the computing system as recited in claim 1, wherein one end of the optical waveguide provides a status indicator that indicates at least one of:
    access of the storage cartridge; and
    power to the storage cartridge.

11. The electronic data storage cartridge for removable coupling to the computing system as recited in claim 1, further comprising an ejection selection means for signaling to the computing system that the storage cartridge should be unlocked and/or ejected.

12. The electronic data storage cartridge for removable coupling to the computing system as recited in claim 1, wherein the optical waveguide couples light of at least two different colors between the two outer surfaces, providing multiple color indications of the status of the electronic data storage cartridge using a single optical waveguide.

13. A method of providing removable data storage for a computing system, the method comprising:
    providing an electronic data storage cartridge, the electronic data storage cartridge comprising a cartridge body that includes at least two outer surfaces, an optical waveguide configured to couple light between the two outer surfaces, a hard disk drive coupled to a connector wherein the connector is configured to couple information to the computing system, and a mechanical write-protect switch on the cartridge body;
    providing the write-protect switch configured to allow determination of a position of the write-protect switch and
    prevention of modification of information on the hard disk drive when the write-protect switch is in an active position;
    receiving light at one outer surface from an optical indicator in the computing system; and
    coupling the light to the other outer surface to visibly signal that the electronic data storage cartridge is write-protected.

14. A system for processing and removably storing information, the system comprising:
    a computing system;
    an electronic data storage cartridge comprising a cartridge body that includes at least two outer surfaces, an optical waveguide configured to couple light between the two outer surfaces, a hard disk drive coupled to a connector wherein the connector is configured to couple information to the computing system, and a mechanical write-protect switch on the cartridge body;
    a bay in the computing system configured to receive the electronic data storage cartridge; and
    a multi-colored optical indicator in the bay;
    wherein when the cartridge is inserted into the bay, a first color of light from the optical indicator is received into the optical waveguide at one outer surface of the electronic data storage cartridge and coupled to the other outer surface to visibly signal a first status of the electronic data storage cartridge, and a second color of light from the optical indicator is received into the optical waveguide at one outer surface of the electronic data storage cartridge and coupled to the other outer surface to visibly signal a second status of the electronic data storage cartridge.

15. The system for processing and removably storing information as recited in claim 14, wherein the position of the mechanical write-protect switch is not visible when the electronic data storage cartridge is inserted into the bay.

16. An electronic data storage cartridge for removable coupling to a computing system, the storage cartridge comprising:
- a cartridge body, wherein the cartridge body includes an outer surface;
- a connector for removable coupling to the computing system, wherein the connector couples information outside the cartridge body;
- an optical waveguide configured to couple light from outside the outer surface to an inside of the cartridge body;
- a storage medium coupled to the connector; and
- a mechanical write-protect switch, which is a mechanical switch on the cartridge body that prevents modification of information on the storage medium when active;
- wherein the cartridge body is configured for removable insertion of the cartridge body into a bay comprising a mating system;
- and wherein the write-protect switch is configured to engage with the mating system.

17. The electronic data storage cartridge for removable coupling to the computing system as recited in claim 16, wherein the storage medium comprises an off-the-shelf hard disk drive.

18. The electronic data storage cartridge for removable coupling to the computing system as recited in claim 16, wherein the storage medium uses solid state memory to store information.

19. The electronic data storage cartridge for removable coupling to the computing system as recited in claim 16, wherein:
the position of the write-protect switch is not visible once the cartridge body is inserted into the bay.

20. The electronic data storage cartridge for removable coupling to the computing system as recited in claim 16, wherein:
the cartridge body is configured for removable insertion of the cartridge body into a bay comprising an optical indicator; and
the optical waveguide receives light at one outer surface from the optical indicator and couples it to the other outer surface to visibly signal that the electronic data storage cartridge is write-protected.

21. The electronic data storage cartridge for removable coupling to the computing system as recited in claim 16, wherein the optical waveguide is configured to couple light of at least two different colors from outside the outer surface to the inside of the cartridge body, providing multiple color indications of the status of the electronic data storage cartridge using a single optical waveguide.

22. An electronic data storage cartridge for removable coupling to a computing system, the storage cartridge comprising:
- a cartridge body, wherein the cartridge body includes an outer surface;
- a connector for removable coupling to the computing system, wherein the connector couples information outside the cartridge body;
- an optical waveguide configured to couple light from an emitter to a visible indicator on the outer surface of the cartridge body;
- a storage medium coupled to the connector; and
- a mechanical write-protect switch, which is a mechanical switch on the cartridge body that prevents modification of information on the storage medium when active;
- wherein:
the outer surface is a first outer surface;
the emitter is comprised in the computing system;
the optical waveguide extends between the first outer surface and a second outer surface;
the optical waveguide receives light at the second outer surface from the emitter; and
the optical waveguide couples the light to the visible indicator.

23. The electronic data storage cartridge for removable coupling to a computing system as recited in claim 22, wherein the storage medium is a hard disk drive.

24. The electronic data storage cartridge for removable coupling to a computing system as recited in claim 22, wherein the storage medium uses solid state memory to store information.

25. The electronic data storage cartridge for removable coupling to a computing system as recited in claim 22, further comprising a second emitter inside the electronic data storage cartridge and coupled to the optical waveguide.

26. The electronic data storage cartridge for removable coupling to a computing system as recited in claim 22, wherein the optical waveguide is configured to couple light of at least two different colors from the emitter to the visible indicator on the outer surface of the cartridge body, providing multiple color indications of the status of the electronic data storage cartridge using a single optical waveguide.

* * * * *